US012595138B2

(12) United States Patent
Struijk et al.

(10) Patent No.: US 12,595,138 B2
(45) Date of Patent: Apr. 7, 2026

(54) SYSTEM FOR SEPARATING BULK-SUPPLIED PLANT-BULBS AND METHOD FOR TRANSPORTING AND SPACING PLANT-BULBS

(71) Applicant: IG Specials B.V., Gameren (NL)

(72) Inventors: Wim Struijk, Delwijnen (NL); Wim Van Der El, Ameide (NL); Bastiaan Ophorst, Gameren (NL); Wim Van Der Meijden, Gameren (NL)

(73) Assignee: IG SPECIALS B.V., Gameren (NL)

( * ) Notice: Subject to any disclaimer, the term of this patent is extended or adjusted under 35 U.S.C. 154(b) by 107 days.

(21) Appl. No.: 18/288,190

(22) PCT Filed: May 9, 2022

(86) PCT No.: PCT/EP2022/062492
§ 371 (c)(1),
(2) Date: Oct. 25, 2023

(87) PCT Pub. No.: WO2022/238333
PCT Pub. Date: Nov. 17, 2022

(65) Prior Publication Data
US 2024/0208743 A1 Jun. 27, 2024

(30) Foreign Application Priority Data

May 10, 2021 (NL) ...................................... 2028182

(51) Int. Cl.
B65G 47/31 (2006.01)
A01D 33/08 (2006.01)
(Continued)

(52) U.S. Cl.
CPC ............. B65G 47/31 (2013.01); A01D 33/08 (2013.01); B65G 43/08 (2013.01); B65G 47/68 (2013.01);
(Continued)

(58) Field of Classification Search
CPC .......................... B65G 47/31; B65G 2811/095
(Continued)

(56) References Cited

U.S. PATENT DOCUMENTS 6,726,002 B2 * 4/2004 van Wijngaarden ........................
B65B 25/046
53/244
9,072,652 B1 * 7/2015 Balasubramanian ..... A61J 7/02
(Continued)

FOREIGN PATENT DOCUMENTS

GB 2028778 A 3/1980
JP S6366014 A 3/1988
(Continued)

OTHER PUBLICATIONS

KR 200345755 Y1 (Year: 2003).*
(Continued)

*Primary Examiner* — Gene O Crawford
*Assistant Examiner* — Lester Ill Rushin
(74) *Attorney, Agent, or Firm* — Benjamin D. van der Sman; HOYNG ROKH MONEGIER B.V.

(57) ABSTRACT

System (1) for separating bulk-supplied plant-bulbs into a single-file stream of spaced plant-bulbs and a method for transporting and spacing objects. The system comprises a bulk-conveyor (2) for conveying a plurality of plant-bulbs as a bulk mass; a single-file vibration-trough (3) downstream of the bulk-conveyor, arranged to receive plant-bulbs from the bulk-conveyor and to further convey received plant-bulbs in single-file; a single-file conveyor (4) downstream of the single-file vibration-trough, arranged to receive plant-bulbs from the vibration-trough; wherein the bulk-conveyor has a discharge edge (21) and the single-file vibration-trough is longitudinally aligned substantially parallel to the discharge edge; wherein the vibration-trough is configured to progress
(Continued)

the plant-bulbs at a first speed, wherein the single-file conveyor is configured to progress the plant-bulbs at a second speed, and wherein the second speed is higher than the first speed whereby during use plant-bulbs transferring from the vibration-trough to the single-file conveyor are spaced on the single-file conveyor.

19 Claims, 4 Drawing Sheets

(51) Int. Cl.
| | |
|---|---|
| B65G 43/08 | (2006.01) |
| B65G 47/68 | (2006.01) |
| A01G 22/35 | (2018.01) |
| A01G 22/60 | (2018.01) |

(52) U.S. Cl.
CPC .............. *A01G 22/35* (2018.02); *A01G 22/60* (2018.02); *B65G 2201/0202* (2013.01); *B65G 2811/095* (2013.01)

(58) Field of Classification Search
USPC ........... 198/419.2, 750.11, 431, 468.01, 376; 414/199
See application file for complete search history.

(56) References Cited

U.S. PATENT DOCUMENTS

| | | | | |
|---|---|---|---|---|
| 10,457,491 | B2 * | 10/2019 | Reed ...................... | B65G 13/06 |
| 10,994,948 | B1 * | 5/2021 | Dwivedi ................ | B65G 47/46 |
| 2019/0307088 | A1 | 10/2019 | Struijk | |
| 2019/0308822 | A1 | 10/2019 | Struijk | |

FOREIGN PATENT DOCUMENTS

| | | | |
|---|---|---|---|
| JP | 2009172480 | A | 8/2009 |
| NL | 1018969 | C | 3/2003 |
| NL | 2022386 | B1 | 8/2020 |
| WO | 2020144318 | A1 | 7/2020 |

OTHER PUBLICATIONS

JP S6366014 A (Year: 1988).*
WO2020144318 (Year: 2019).*
KR200345755Y1 (numbered paragraphs) (Year: 2003).*
CN114056654 (Year: 2022).*
JPS6366014 (Year: 1988).*
NL2022385 (Year: 2019).*

* cited by examiner

SYSTEM FOR SEPARATING BULK-SUPPLIED PLANT-BULBS AND METHOD FOR TRANSPORTING AND SPACING PLANT-BULBS

FIELD OF THE INVENTION

The invention relates generally to a system for transporting and separating bulk-supplied plant-bulbs; to a method for transporting and separating bulk-supplied plant-bulbs; to an apparatus for transporting, separating, and picking plant-bulbs from a bulk supply; to a method for transporting, separating bulk-supplied, and picking plant-bulbs; and to an apparatus and/or method for supplying, separating, picking and planting plant-bulbs.

BACKGROUND OF THE INVENTION

In the common course of events, plant-bulbs may be supplied to growers or handlers loose in large crates or boxes. To manually pick and place those plant-bulbs, for example for growing purposes, they may be provided on a picking surface or conveyor from which they can be picked. For automated picking systems and methods using camera imaging for identification and robot arm mounted grippers; or for supplies to a restricted surface area for picking by a worker; a more structured supply may be desirable. In particular, a controlled separation and distribution of the objects to be picked may be advantageous to improve accuracy and/or efficiency.

In addition, modern handling processes for plant bulbs, such as packing processes, (quality) control analysis, and planting, often require that discrete plant-bulbs are transported and separated out from a bulk supply of plant-bulbs for provision to handling, analysis or processing stations.

It may also be a requirement of some processes that plant-bulbs are provided in a particular manner to allow efficiency and/or automation of an operation. Plant-bulbs, such as flower bulbs or legumes such as onions or garlic bulbs may benefit from a handling system that enables the provision of discrete objects with a regular, predetermined spacing between them. A plant-bulb, preferably a flower-bulb, separating and spacing system that can consistently provide objects at a predetermined spacing may be desirable.

For example, plant-bulbs (in particular flower bulbs) are preferably consistently planted in an upright position with the bud of the bulb (i.e., the point from which the flower/plant grows) upward and the basal stem downward to ensure predictable growth. That is, a misoriented bulb may grow its stem initially downwardly or horizontally. While the flower may then correct its growth direction upwardly, the total vertical height that the flower bloom attains, compared to flowers that are correctly oriented, is less. As a result, incorrectly oriented flower bulbs may result in shorter flower stems, which leads to inconsistency in the flower crop once harvested.

To this end, machinery is known for picking and orienting bulbs into an upright position prior to planting. An example of relevant pick-and-plant operations and apparatuses for flower bulbs, for combination with the present invention is discussed in document patent publication US2019/0307088 and US2019/0308822, the contents of which are incorporated herein in their entirety by way of reference. In particular, the picking and placing discussed therein may benefit from a handling system that provides bulbs with a predetermined spacing and/or alignment upon a transport device (e.g. conveyor).

For an efficient and optimized use of such picking and orienting machinery, the bulbs, which are provided in bulk at the beginning of an operation are preferably separated from the bulk and presented to the picking machinery as individual, discrete, or separate objects. This may ease the picking machinery's task of identifying plant-bulbs as compared to plant-bulbs provided in bulk (e.g. plant-bulbs presented as a pile or heap, with multiple bulbs in all x, y and z directions). The bulbs in a bulk batch may vary widely in shape, size, and orientation. They may also lie on top of one another, making it sometimes difficult to capture a single bulb visually or physically without damaging others. Additionally, known machinery for picking and planting bulbs, uses image recognition of the bulb prior to grasping a bulb to determine the orientation and the translation required to orient the bulb upright. Mapping the bulb in such a manner is complex if the bulbs are provided in bulk. For instance, static reference points are difficult to determine if the bulb is provided in bulk because the plant-bulb or neighboring bulbs may move.

A solution to this problem is to provide the machinery with a single-file row of bulbs with predetermined spacing therebetween. This can aid image recognition of each bulb individually. In addition, a separated bulb (individualized from the bulk) can assist a picking head in accurately capturing the bulb without damaging the bulb or other bulbs in the process, in particular the fragile shoot parts. This can result from a greater freedom of the gripping machinery to operate in an empty volume around the plant-bulb which leads to greater precision and lowers the risk of damage to the bulb or other bulbs. This may also allows for the use of gripping machinery of reduced complexities, requiring less precision and/or delicate gripping head parts.

The provision of spaced plant-bulbs, preferably with a (reasonably) predeterminable distance between the bulbs can be a time-consuming process, especially if done manually, leading to cost-inefficiency and to problems associated with human error and handling.

A supply of spaced individual plant-bulbs may also advantageously allow better (automated) quality control analysis of individual items, e.g. by x-ray or any other analysis technique. This is described in document Dutch patent publication NL1018969, which discloses a sorting apparatus for flower bulbs. The apparatus comprises an x-ray control unit, which requires the provision of spaced individual (singled) flower bulbs. The document discloses a vibration-trough that transports the flower bulbs towards a stepped flight, each step separately lifting a flower bulb towards a series of vibrating cups, which are led towards the x-ray control unit. This system is complex and may not meet precision and efficiency needs. In particular, the use of flights and separate vibrating cups may increase the complexity of the apparatus.

Further attempts have been made to provide an automated solution for the transportation and separation of bulbs or the like. One such attempt is disclosed in document NL2022386, which discloses a plurality of spaced interference-flights that are arranged to single-file process the bulbs.

There, however, remains a need for an improved transportation and plant-bulb separating method and/or apparatus.

The present invention is concerned with addressing one or more the above concerns, and with providing further useful devices and methods for supplying and transporting objects, while at the same time maintaining high levels of effectiveness and efficiency.

SUMMARY OF THE INVENTION

In an aspect of the invention, there is provided a system for separating bulk-supplied plant-bulbs into a single-file stream of spaced plant-bulbs, the system comprising: a bulk-conveyor for conveying a plurality of plant-bulbs as a bulk mass; a single-file vibration-trough downstream of the bulk-conveyor, arranged to receive plant-bulbs from the bulk-conveyor and to further convey received plant-bulbs in single-file; a single-file conveyor downstream of the single-file vibration-trough, arranged to receive plant-bulbs from the vibration-trough; wherein the bulk-conveyor has a discharge edge and the single-file vibration-trough is longitudinally aligned substantially parallel to the discharge edge; wherein the vibration-trough is configured to progress the plant-bulbs at a first speed, wherein the single-file conveyor is configured to progress the plant-bulbs at a second speed, and wherein the second speed is higher than the first speed whereby during use plant-bulbs transferring from the vibration-trough to the single-file conveyor are spaced on the single-file conveyor. The second speed is preferably from 0.10 to 1.0 m/s more preferably from 0.3 to 0.5 m/s, and more preferably from 0.36 to 0.45 m/s.

The bulk-conveyor is arranged to convey a plurality of plant-bulbs as a bulk mass. A bulk mass is understood to comprise both a single layer of plant-bulbs and a multi-layer volume (i.e., multiple layers in height). The vibration-trough is arranged to move the bulbs along the trough by means of vibration. The vibration of the trough also advantageously arranges the bulbs in a single file (both in terms of width and height). For example, if one bulb lands on top of two other bulbs, which are positioned closely together, the vibrations of the trough will lead the top bulb to slot in between the two other bulbs.

In example embodiments, the bulk-conveyor may be a conveyor belt, a vibrating conveyor belt or a vibration-plate to progress the plant-bulbs along the system. The bulk-conveyor may additionally be angled to facilitate easier progression of the plant-bulbs. Similarly, the vibration-trough may also be arranged in a slightly angled position, if so required.

The single-file vibration-trough being longitudinally aligned and substantially parallel to the discharge edge of the bulk-conveyor ensures that a single file of bulbs is formed without providing additional guidance to the bulbs. This substantially lateral provision of bulbs from the discharge edge to the vibration-trough thus limits the required handling of the bulbs, thereby decreasing the change of system failure or bulb damaging. The direction of movement of the bulk-conveyor may be perpendicular to the longitudinal direction of the vibration-trough. However, in other embodiments, the direction of movement of the bulk-conveyor may be anywhere between 0° to 180°, provided that the discharge edge of the bulk-conveyor is substantially parallel to the longitudinal direction of the vibration-trough.

The difference in progression speed between the vibration-trough and the single-file conveyor ensure spacing between the bulbs on the single-file conveyor. In a preferred embodiment, the difference in progression speed leads to a spacing of at least 1 cm, preferably at least 3 cm, more preferably at least 5 cm.

In an embodiment, the vibration-trough vibrates at a frequency of up to 200 Hz, preferably at a frequency between about 80 and 110 Hz, more preferably of between about 95 and 105 Hz. In an embodiment, the vibration-trough vibrates with an amplitude of between about 0 and 100 G, preferably of between about 60 and 100 G, more preferably of between about 70 and 90 G. In an embodiment, the first speed is from about 0.0005 to 0.3 m/s, preferably from about 0.035 to 0.25 m/s, more preferably of from about 0.072 to 0.21 m/s. In an embodiment, the second speed is from about 0.002 m/s to 0.05 m/s, preferably from about 0.005 to 0.03 m/s, more preferably of from about 0.008 to 0.023 m/s. By influencing the vibration frequency and the amplitude of the vibrations, the progression speed can be set to a preferred speed. Of course, other factors further influence progression of the plant-bulbs, such as the incline, surface roughness, and the type of plant-bulbs that are moved. By influencing the vibration characteristics, along with the other influencing factors, a progression rate of at least about 17 bulbs per minute may be achieved in an embodiment of the invention, preferably at least about 42 bulbs per minute, more preferably at least about 225 bulbs per minute.

In an embodiment, the vibration-trough is provided with sidewalls extending substantially parallel to the conveyance direction of the plant-bulbs, preferably wherein the vibration-trough comprises a V-shape cross-section perpendicular to the conveyance direction of the plant-bulbs. The sidewalls of the vibration-trough direct the plant-bulbs into a single file. The sidewalls of the vibration-trough may be spaced in such a way that only a single file of plant-bulbs can pass along the vibration-trough. In a preferred embodiment, the V-shape cross-section of the vibration-trough further ensures that the orientation of the plant-bulbs is facilitated so that the bud of the plant-bulb (i.e., the point from which the flower/plant grows) is directed upwardly. This facilitates easier handling and greater product control in later stages.

In an embodiment, the bulk-conveyor has a width, and is arranged to convey a single-depth layer of plant-bulbs, the width of the bulk-conveyor accommodating a plurality of bulbs substantially horizontally adjacent in a direction perpendicular to the direction of conveyance.

In an embodiment, an upstream conveyor is provided upstream of the bulk-conveyor, the upstream conveyor being arranged to supply plant-bulbs to the bulk-conveyor in a substantially single-depth layer. In a preferred embodiment, the upstream conveyor is a vibration-plate. In a preferred embodiment, the vibration-plate vibrates at a frequency of up to 200 Hz, preferably from about 80 and 110 Hz, preferably of between from 80 and 110 Hz, more preferably of from about 95 to 105 Hz.

The upstream conveyor (preferably a vibration-plate), positioned upstream of the bulk-conveyor ensures that a stacked volume of plant-bulbs (i.e. of multiple layers in height) can be provided to the system while still supplying the vibration-trough in single-file configuration. In particular, the vibrations of the vibration-plate ensure a single layer of bulbs is provided to the bulk-conveyor, which leads them to the vibration-trough. The provision of bulbs to the vibration-trough is preferred to be in a single file, without too many stacked bulbs. To ensure a high precision of the supply of bulbs to the vibration-trough, a single layer of bulbs is preferred to a stacked configuration. A stacked configuration requires a very slow supply of bulbs to ensure that stacked bulbs in the vibration-trough are limited. Since the variation of bulb supply to the system strongly varies, the speed of the bulk-conveyor would have to be very slow. A vibration-plate upstream of the bulk-conveyor and the vibration-trough solves this problem by allowing for relatively fast stacked bulk deposition on the vibration-plate and vibrating the stacked bulbs into a single plane, prior to the bulbs being supplied to the bulk-conveyor, and subsequently to the vibration-trough. This strongly increases the overall system efficiency and precision.

In an embodiment, a stacked supply of plant-bulbs is provided upstream of the vibration-plate. In an embodiment, the system further comprises a controller, said controller being arranged to control the speed of the conveyors and/or frequencies and/or amplitudes of the vibration-trough and vibration-plate. The speed of the conveyors and the frequencies and amplitude of the vibration-trough and vibration-plate determine the speed with which the bulbs move along the system. The provision of a controller which can control these variables ensures that the machine is able to adapt to certain circumstances that lead to different optimal variables. For example, another size bulb may require different speeds of the bulbs moving through the system.

In an embodiment, the system further comprises at least one sensor arranged to determine whether bulbs are present, preferably wherein the sensor is positioned on or near the bulk-conveyor, on a side of the bulk conveyor close to the vibration-plate. In a preferred embodiment, the sensor is arranged to signal the controller if there are bulbs, or if there are no bulbs present at an upstream entry point on the bulk-conveyor, and wherein the controller is arranged to actuate the vibration-plate to provide bulbs to the bulk-conveyor upon receiving a signal indicating that said entry point is empty. The sensor being provided at the beginning of the bulk-conveyor advantageously provides a secure feedback system to the controller for providing the bulk-conveyor with an additional supply of bulbs when that is required. In an advantageous embodiment, the controller stops the vibration-plate from providing new bulbs to the bulk-conveyor unless the sensor indicates that the bulk-conveyor plate can receive a new batch. The controller then actuates the vibration-plate for a predetermined speed and time to provide the vibration-plate with a new batch of bulbs. Once the bulk-conveyor has moved the new batch of bulbs along the system, and the sensor determines that there are no bulbs present at the beginning of the bulk-conveyor, the controller may once again actuate the vibration-plate to provide a new batch of bulbs. This principle is equally applicable to the interfaces of the other conveyor-units of the present disclosure. For example, a sensor may also be provided on the vibration-trough so that the vibration-trough is only supplied with new bulbs from the bulk-conveyor when the vibration-trough is not filled with bulbs at the point of entry.

In an embodiment, the single-file conveyor comprises two or more lateral-conveyors, defining a channel for accepting plant-bulbs received from the vibration-trough. The provision of two conveyors leads to the advantageous effect that sideways movement of the bulbs is prevented. As a result, the bulbs are stabilised while the speed of the bulbs is increased to define a space between individual bulbs. A further advantage of two conveyors defining a V-shaped path is that the contact surface of the conveyors to the bulbs is larger than with a single conveyor. This increases the allowable speed difference between the vibration-trough and the single-file conveyor. As a result of the increased output-speed, the efficiency of the system is increased. The general shape of the single-file conveyor may thus be in accordance with the general shape of the vibration-trough (e.g. both V-shaped cross-sections). In a preferred embodiment, an angle between opposing lateral conveyors is from about 30° to 150°, preferably from about 60° to 120°, more preferably from about 80° to 100°. The angle between the two conveyors constituting the single-file conveyor determines the pressure that the conveyors exert on the bulbs. If the angle is small, the bulbs are more strongly wedged between the conveyors, increasing the pressure exerted on the bulbs. This increases the allowed acceleration of the bulbs. However, if the angle is too small, the pressures may become too high and the bulbs may be damaged. There is thus an optimal angle between the conveyors, allowing for high acceleration without damaging the bulbs. This may be dependent on the type of bulbs (the size, shape, fragility, etc) and on the required speed of the system.

In an embodiment, the system further comprises one or more transition conveyors disposed between the vibration-trough and the single-file conveyor, said transition conveyors being arranged to move the bulbs at a third speed, wherein the third speed is lower than the second speed and equal to or higher than the first speed. The provision of transition conveyors between the vibration-trough and the single-file conveyor provides additional control to the transition between the first speed of the vibration-trough and the second speed of the single-file conveyor. In particular, the transition of the vibration-trough to the single-file conveyor includes the transition of the bulbs from a vibrating (and thus moving) element to a fast conveyor. This can cause bulbs to get stuck or to jump out of the system. To limit this problem, the provision of transition conveyors may have a speed corresponding roughly to the speed of the bulbs on the vibration-trough so that the bulbs are allowed to settle on the transition conveyors prior to the increase of their speed. The transition conveyors lead to smaller steps and/or changes to the speed and movement of the bulbs, thereby leading to an increased consistency and precision of the system.

In an embodiment, the system further comprises a downstream bulb handling system, preferably wherein the downstream bulb handling system is a flower bulb pick and place apparatus.

In an aspect of the invention, there is provided a method for transporting and spacing objects, the method comprising the steps of: providing a bulk-conveyor; providing a vibration-trough, arranged to receive bulbs either directly or indirectly from the bulk-conveyor; providing a single-file conveyor, arranged to receive bulbs from the vibration-trough; providing the bulk-conveyor with bulbs in bulk; moving the bulbs to the vibration-trough; moving the bulbs through the vibration-trough at a first speed; moving the bulbs along the single-file conveyor at a second speed, the second speed being higher than the first speed; and providing a distance between the bulbs on the single-file conveyor.

In an embodiment, the bulk-conveyor has a discharge edge and the single-file vibration-trough is longitudinally aligned substantially parallel to the discharge edge, and wherein the bulbs are provided by the discharge edge to the single-file vibration-trough substantially laterally to the vibration-trough.

In an embodiment, the method further includes the step of transporting the bulbs to a downstream object handling system, preferably wherein the downstream handling system is a flower object pick and place apparatus. Further aspects of the invention concern methods of planting plant-bulbs and methods of producing crops of flowers.

In a further aspect, a method may comprise the steps of, providing a bulk pile of plant-bulbs; reducing the bulk pile to a bulk single-layer of plant-bulbs by conveyance and preferably vibration; reducing the bulk single-layer to a single-file stream of adjacent plant-bulbs by deposition to a single-file conveyor; and spacing adjacent.

BRIEF DESCRIPTION OF THE DRAWINGS

Various aspects of the invention will be further explained with reference to embodiments shown in the drawings wherein.

DESCRIPTION OF ILLUSTRATIVE EMBODIMENTS

The following is a description of various embodiments of the invention, given by way of example only and with reference to the drawings.

Figure 1:
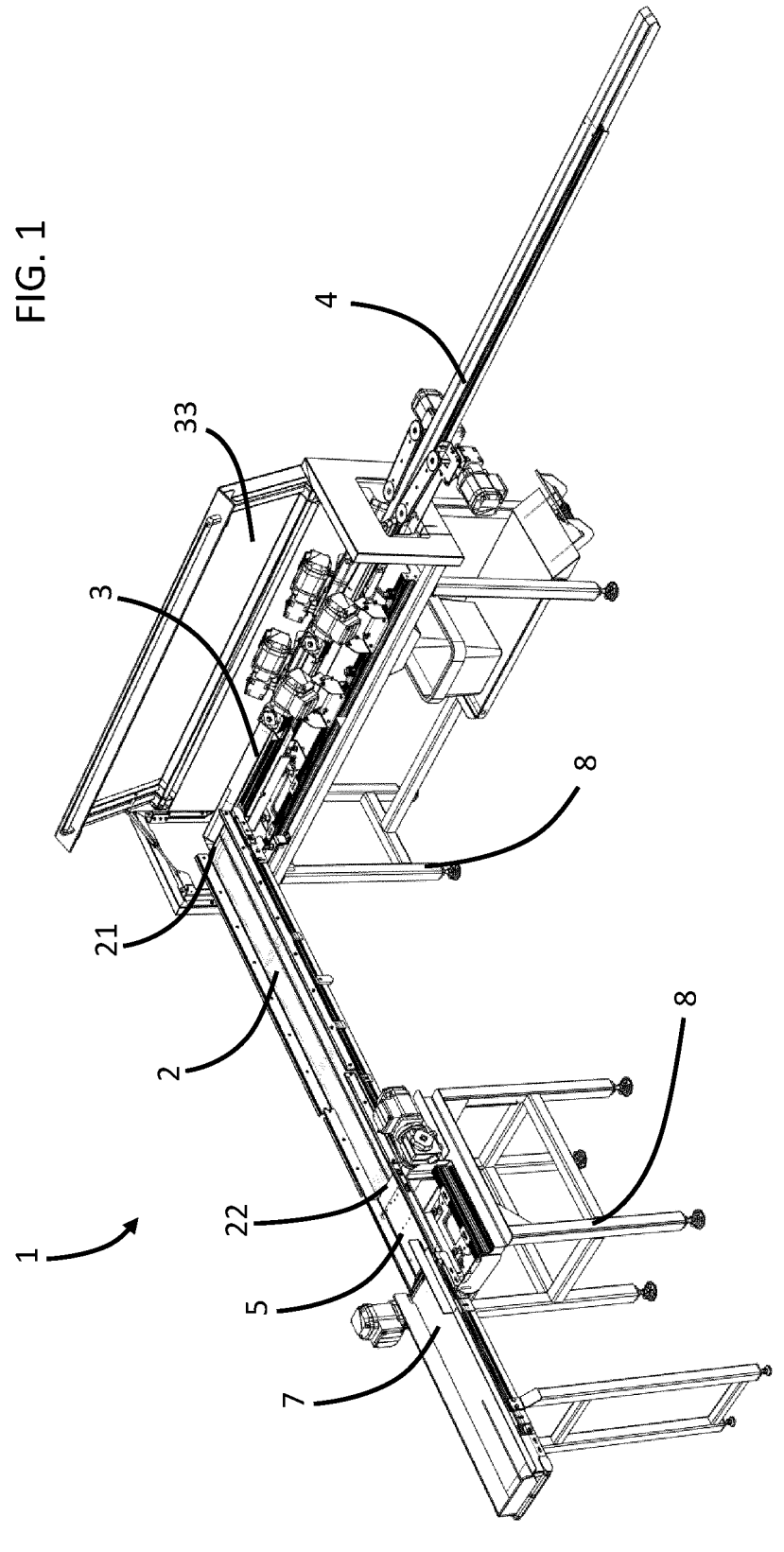
FIG. 1 shows an isometric view of a system for separating bulk-supplied plant-bulbs into a single-file stream of spaced plant-bulbs.

FIG. 1 shows an isometric view of a system 1 for separating bulk-supplied plant-bulbs into a single-file stream of spaced plant-bulbs. The system is shown to comprise a bulk-conveyor 2, which is arranged to provide a vibration-trough 3 with plant-bulbs over the discharge edge 21 of the bulk-conveyor. Upstream of the bulk-conveyor, a vibration-plate 5 is provided, arranged to provide the bulk-conveyor with a single-layer bulk mass of plant-bulbs over the entry point 22 of the bulk-conveyor 2. The vibration-plate 5 ensures the provision of a single-layer mass of plant-bulbs to the bulk-conveyor 2.

Upstream of the vibration-plate 5 a stacked conveyor 7 may be provided to provide the system 1 with a stack, pile or heap of plant-bulbs (i.e. a mass of plant bulbs extending more than one plant-bulb dimension in each x y and z dimension). The supply speed of the plant-bulbs from the stacked conveyor 7 onto the vibration-plate 5 is controlled, preferably by intermittent actuation of the stacked conveyor 7 to provide a single-layer of bulbs to the vibration-plate 5.

Since a number of bulbs may drop onto the vibration-plate 5 simultaneously, some bulbs may be positioned atop one another once provided onto the vibration-plate 5. The vibration-plate 5 is arranged to vibrate such that the deposited plant-bulbs are driven forward and such that potentially stacked plant-bulbs spread over the upper surface of vibration-plate 5 to provide a single-layer bulk mass of plant-bulbs moving downstream. The single-layer bulk of plant-bulbs extends only a single bulb dimension in the vertical direction (z dimension) and extends more than one bulb dimension in the x and y dimensions. Vibration-plate 5 may so provide the bulk-conveyor 2 with a single-layer of plant-bulbs, even though the stacked conveyor 7 may on occasion deposit too many plant-bulbs at once.

The bulk conveyor 2 is preferably a belt conveyor, preferably a continuous loop conveyor belt.

At the transition from the stacked conveyor 7 to the vibration-plate 5 a sensor may be provided to determine whether there is open volume on the vibration-plate 5 for the stacked conveyor 7 to shift plant-bulbs on to it. Depositing plant-bulbs onto the vibration-plate 5 too quickly may result in difficulties in achieving a single depth layer of plant-bulbs. The stacked conveyor 7 may be controlled to operate and/or deposit plant-bulbs onto vibration plate 5 only if a volume at the upper surface of the vibration plate 5, adjacent the outlet of the stacked conveyor 7, is empty of plant-bulbs. A suitable sensor may be a laser sensor, although other sensors may be used.

Once the single-layer bulk mass of plant-bulbs is provided onto the bulk-conveyor 2, it is propelled towards the vibration-trough 3, which receives the plant-bulbs in single-file in a direction substantially perpendicular to the outlet end of bulk-conveyor 2, in the shown embodiment. The vibration-trough 3 propels the plant-bulbs at a first speed in the direction of a single-file conveyor 4. The single-file conveyor 4 progresses the plant bulbs at a second speed, wherein the second speed is higher than the first speed. The single-file conveyor 4 preferably operates at a speed of 0.36 to 0.45 m/s.

As the plant-bulbs transition from single-file propulsion at a first (lower) speed to a single-file propulsion at a second (higher) speed, the plant-bulbs are controllably spaced from one another according to the ratio of the first and second speeds, that is the spacing relates to the speed of propulsion of a preceding plant-bulb by the single-file conveyor 4 and the time taken to supply the subsequent plant-bulb. This aids in providing the plant-bulbs to the single-file conveyor 4 with controllable and predictable spacing, in turn aiding automated analysis and/or pick up.

The single-file conveyor 4 is preferably a belt conveyor, preferably a continuous loop conveyor belt.

The vibration-trough 3 is elongate and is provided with sidewalls running in the length of the trough. The vibration-trough 3 preferably has a V-shaped transverse cross-section, having an internal width approximate to that of a plant-bulb dimension. Such a transverse cross-section may act to cradle supplied plant-bulbs and encourage single-file arrangement thereof, in particular through vibration of the trough. Other transverse cross-sections may also be used, for example U-shaped. Multi-channel vibratory troughs, having parallel single-file channels may also be envisaged.

The system 1 may be provided on a support structure 8. In other embodiments, the system 1 may be bolted directly to a wall or positioned on the floor. Parts of the system 1 may be provided within an encasement 33. This is particularly beneficial for parts of the system 1 that are prone to damaging or that are likely to damage workers. In the shown embodiment, actuators for the conveyors downstream of the vibration-trough 3 are provided within the encasement 33.

Figure 2:
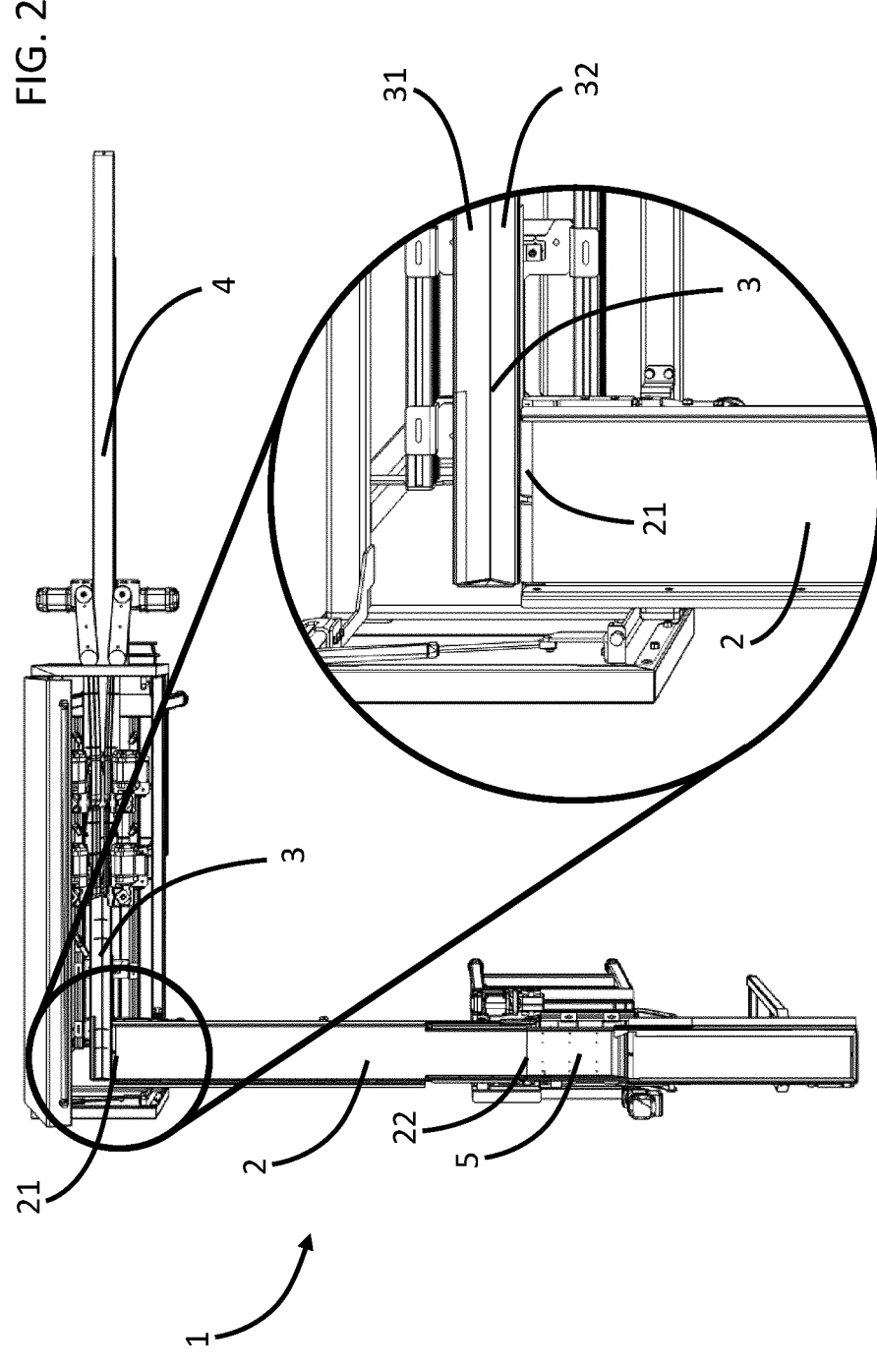
FIG. 2 shows a top-view of a system for separating bulk-supplied plant-bulbs into a single-file stream of spaced plant-bulbs, with a blow-out figure of an interface between a bulk-conveyor and a vibration-trough.

FIG. 2 shows a top-view of a system 1 for separating bulk-supplied plant-bulbs into a single-file stream of spaced plant-bulbs, with a expanded figure of an interface between a bulk-conveyor 2 and a vibration-trough 3. The expanded figure shows that the discharge edge 21 of the bulk-conveyor 2 is substantially parallel to the longitudinal direction of the vibration-trough 3. This arrangement may substantially supply consecutive single file rows of plant-bulbs from the discharge edge 21 into the vibration trough 3, the vibration trough 3 propelling plant-bulbs downstream, making space for a subsequent row of plant-bulbs from the single-layer bulk on bulk-conveyor 2. The bulk of plant-bulbs may thus be efficiently transitioned from a single-layer bulk to a single-file stream of plant-bulbs.

The vibration-trough 3 is also shown to comprise two sidewalls 31, 32 extending substantially parallel to the conveyance direction of the plant-bulbs. In the shown embodiment, the sidewalls 31, 32 of the vibration-trough 3 form a V-shape cross-section perpendicular to the conveyance direction of the plant-bulbs. As mentioned, the provision of such sidewalls 31, 32 further aids the stability of the plant-bulbs and aids in the formation of a single-file plurality of plant-bulbs.

Figure 3:
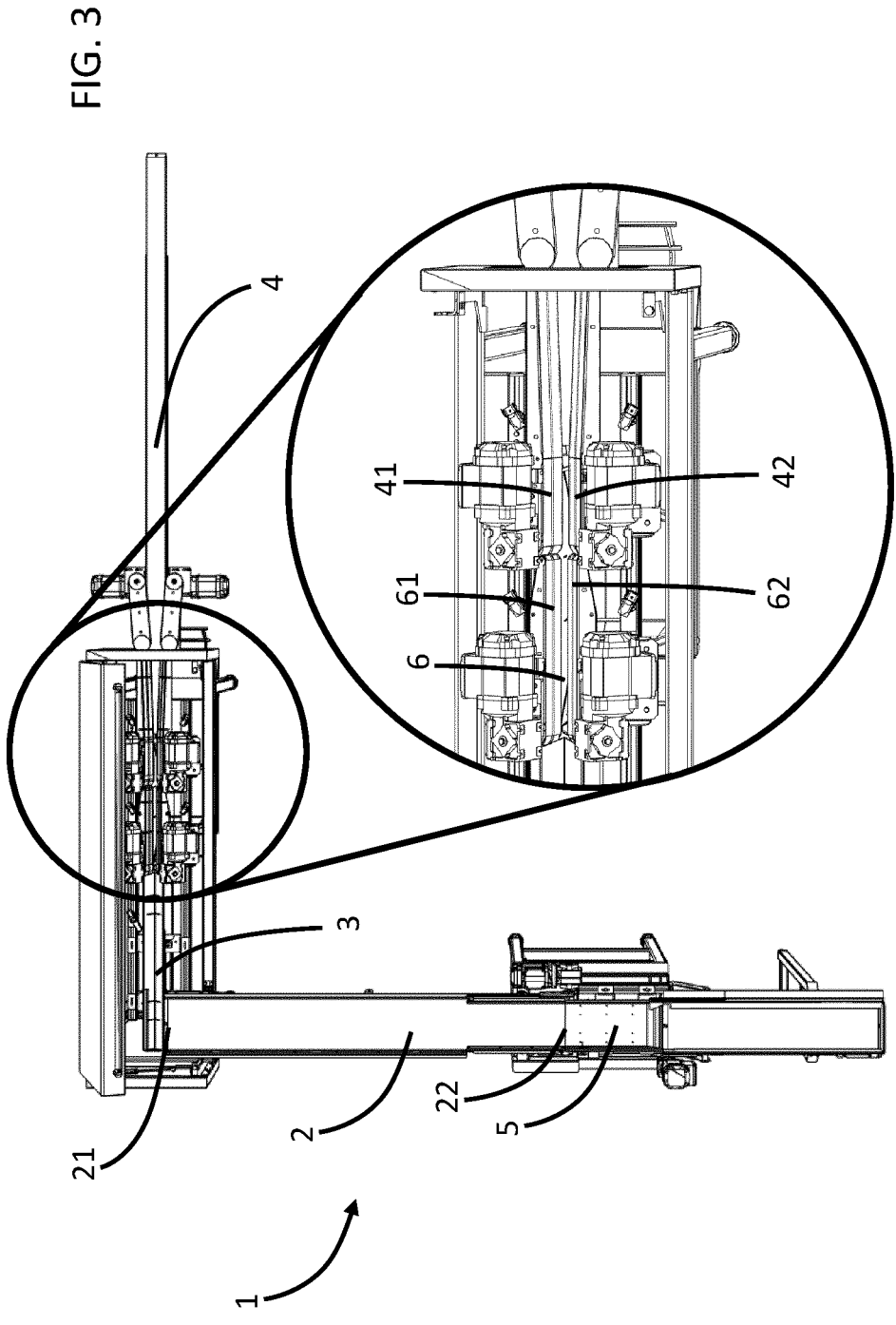
FIG. 3 shows a top-view of a system for separating bulk-supplied plant-bulbs into a single-file stream of spaced plant-bulbs, with a blow-out figure of an interface between a vibration-trough and a single-file conveyor.

FIG. 3 shows a top-view of a system 1 for separating bulk-supplied plant-bulbs into a single-file stream of spaced plant-bulbs, with an expanded figure of an interface between a vibration-trough 3 and a single-file conveyor 4. The shown embodiment comprises a single-file conveyor belt trough or transition conveyor 6 between the vibration trough 3 and the single-file conveyor 4. Two lateral transition conveyors 61, 62, which form the transition conveyor 6. The transition conveyor 6 aids in stabilizing the plant-bulbs as they leave the vibration-trough 3. The transition conveyor 6 progresses the plant-bulbs at a third speed, wherein the third speed is lower than the second speed and equal to or higher than the first speed. The transition conveyor 6 may already accelerate the plant-bulbs slightly upon leaving the vibration-trough 3.

The lateral transition conveyors 61, 62 preferably operate at a speed between about 0.025 and 0.25 m/sec, preferably between about 0.035 and 0.20 m/sec, more preferably 0.058 and 0.17 m/sec.

The lateral transition conveyors 61, 62 are preferably belt conveyors, preferably continuous loop conveyor belts.

The shown embodiment further comprises a single-file conveyor 4 comprising two lateral single-file conveyors 41, 42 extending along an initial entry point of the single-file conveyor 4. The lateral single-file conveyors 41, 42, just as the lateral transition conveyors 61, 62, are positioned in an angled fashion to one another so that they form a substantially V-shaped cross-sectional shape. This ensures that the plant-bulbs are stabilised upon transportation and do not roll sideways. As previously mentioned U-shaped cross-sections may also be employed.

The lateral single-file conveyors 41, 42 preferably operate at a speed between substantially equal to speed of the single-file conveyor 4.

Figure 4:
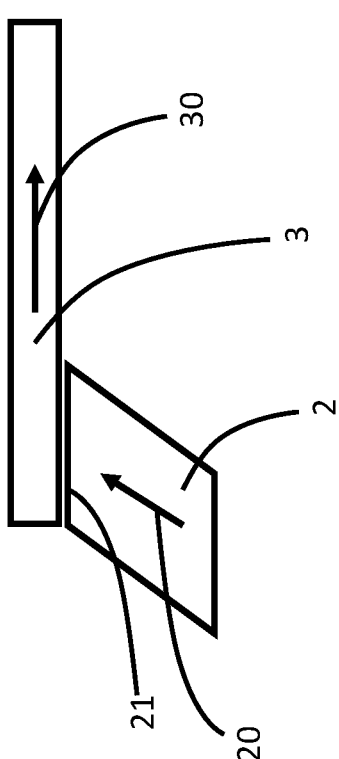
FIG. 4 shows a schematic top view of an interface between a bulk-conveyor and a vibration-trough.

FIG. 4 shows a schematic top view of an interface between a bulk-conveyor 2 and a vibration-trough 3. As shown, the direction of movement of the bulbs on the bulk-conveyor 2, indicated with arrow 20, is not perpendicular to the direction of movement of the plant-bulbs in the vibration trough 3, indicated with arrow 30. However, the discharge edge 21 of the bulk-conveyor 2 is still substantially parallel to the longitudinal direction of the vibration-trough 3, ensuring a steady supply of bulbs to the vibration-trough 3 without having to direct the plant-bulbs, thereby increasing the chance of damaging the plant-bulbs. The parallel position of the discharge edge 21 of the bulk-conveyor 2 ensures the provision of a single-file supply of plant-bulbs to the vibration trough 3.

The invention claimed is:

1. A method for transporting and spacing plant-bulbs, the method comprising the steps of:
   providing a system comprising a bulk-conveyor; a single-file vibration-trough, arranged to receive plant-bulbs either directly or indirectly from the bulk-conveyor; a single-file conveyor, arranged to receive plant-bulbs from the single-file vibration-trough;
   supplying a bulk of plant-bulbs to the bulk-conveyor;
   transporting the plant-bulbs to the single-file vibration-trough by way of the bulk-conveyor;
   transporting the plant-bulbs along the single-file vibration-trough at a first speed by operating the single-file vibration-trough; and transporting the plant-bulbs along the single-file conveyor at a second speed, the second speed being higher than the first speed to space the plant-bulbs in a length of the single-file conveyor,
   wherein the bulk-conveyor has a discharge edge and at least a portion of the single-file vibration-trough is longitudinally aligned substantially parallel to the discharge edge, and wherein the plant-bulbs are provided by the discharge edge to the single-file vibration-trough substantially laterally to the single-file vibration-trough.

2. The method of claim 1, wherein plant-bulbs are propelled by vibrating the single-file vibration-trough.

3. The method of claim 1, wherein the single-file vibration-trough comprises a single-file conveyor belt trough, and plant-bulbs are propelled by driving conveyor belts of the single-file conveyor belt trough.

4. The method of claim 1, wherein the single-file vibration-trough comprises an upstream single-file vibration-trough for propelling the plant-bulbs by vibration and a downstream single-file conveyor belt trough for propelling the plant-bulbs by driving conveyor belts, wherein the upstream single-file vibration-trough supplies plant-bulbs to the downstream single-file conveyor belt trough, and the downstream single-file conveyor belt trough supplies plant-bulbs to the single-file conveyor, the single-file conveyor operating at a higher speed than the single-file conveyor belt trough.

5. A system for separating bulk-supplied plant-bulbs into a single-file stream of spaced plant-bulbs, the system comprising:
   a bulk-conveyor for conveying a plurality of plant-bulbs as a bulk mass;
   a single-file vibration-trough downstream of the bulk-conveyor, arranged to receive plant-bulbs from the bulk-conveyor and to further convey received plant-bulbs in single-file;
   a single-file conveyor downstream of the single-file vibration-trough, arranged to receive plant-bulbs from the single-file vibration-trough;
   wherein the bulk-conveyor has a discharge edge and the single-file vibration-trough is longitudinally aligned substantially parallel to the discharge edge, and wherein the plant-bulbs are provided by the discharge edge to the single-file vibration-trough substantially laterally to the single-file vibration-trough;
   wherein the single-file vibration-trough is configured to progress the plant-bulbs at a first speed,
   wherein the single-file conveyor is configured to progress the plant-bulbs at a second speed, and
   wherein the second speed is higher than the first speed whereby during use plant-bulbs transferring from the single-file vibration-trough to the single-file conveyor are spaced on the single-file conveyor.

6. The system of claim 5, wherein the single-file vibration-trough comprises a single-file vibration-trough arranged to propel plant-bulbs by vibration.

7. The system of claim 5, wherein the single-file vibration-trough comprises a single-file conveyor belt trough arranged to propel plant-bulbs by driving conveyor belts.

8. The system according to claim 5, wherein the single-file vibration-trough vibrates at a frequency of up to 200 Hz, wherein the first speed is from about 0.0005 to 0.3 m/s and/or the second speed is from about 0.002 m/s to 0.05 m/s.

9. The system according to claim 5, wherein the single-file vibration-trough is provided with sidewalls extending substantially parallel to the conveyance direction of the plant-bulbs.

10. The system of claim 5, wherein the bulk-conveyor has a width, and is arranged to convey a single-layer of plant-bulbs, the width of the bulk-conveyor accommodating a plurality of plant-bulbs substantially horizontally adjacent in a direction perpendicular to the direction of conveyance.

11. The system according to claim 5, wherein an upstream conveyor is provided upstream of the bulk-conveyor, the upstream conveyor being arranged to supply plant-bulbs to the bulk-conveyor in a substantially single-depth layer.

12. The system according to claim 5, wherein a hopper is provided upstream of the vibration-plate and is arranged to deposit stacks or piles of plant-bulbs to the system.

13. The system according to claim 5, further comprising a controller, said controller being arranged to control the speed of the conveyors and/or frequencies and/or amplitudes of the vibrations.

14. The system according to claim 13, further comprising at least one sensor arranged to determine whether plant-bulbs are present.

15. The system according to claim 14, wherein the sensor is arranged to signal the controller if there are plant-bulbs, or if there are no plant-bulbs, present at an upstream entry point of the vibration-plate to provide plant-bulbs.

16. The system according to claim 5, wherein the single-file conveyor comprises two or more lateral-conveyors, defining a channel for accepting plant-bulbs received from the single-file vibration-trough.

17. The system according to claim 16, wherein an angle between opposing lateral conveyors is from about 30° to 150.

18. The system according to claim 5, further comprising one or more transition conveyors disposed between the single-file vibration-trough and the single-file conveyor, said transition conveyors being arranged to move the plant-bulbs at a third speed, wherein the third speed is lower than the second speed and equal to or higher than the first speed.

19. A plant-bulb growth installation comprising:

a bulk supply of plant-bulbs;

a system according to claim 5;

a plant-bulb grow station comprising growth stimuli, growth media and/or nutrition;

and a harvester for harvesting pre-bloom or blooming flowers as a crop.

* * * * *